(12) United States Patent
Patton, Jr. et al.

(10) Patent No.: US 9,463,525 B2
(45) Date of Patent: Oct. 11, 2016

(54) LASER ENCLOSURE

(71) Applicant: Lincoln Global, Inc., City of Industry, CA (US)

(72) Inventors: Donald M Patton, Jr., Mentor on the Lake, OH (US); Jung Hwa Lee, Shaker Heights, OH (US); Craig A. Gibson, Perry, OH (US)

(73) Assignee: Lincoln Global, Inc., City of Industry, CA (US)

( * ) Notice: Subject to any disclaimer, the term of this patent is extended or adjusted under 35 U.S.C. 154(b) by 221 days.

(21) Appl. No.: 14/178,377

(22) Filed: Feb. 12, 2014

(65) Prior Publication Data

US 2015/0122787 A1 May 7, 2015

Related U.S. Application Data

(60) Provisional application No. 61/900,436, filed on Nov. 6, 2013.

(51) Int. Cl.
| B23K 9/12 | (2006.01) |
| B23K 9/32 | (2006.01) |
| B23K 9/095 | (2006.01) |
| G01C 3/00 | (2006.01) |
| B23K 9/127 | (2006.01) |

(52) U.S. Cl.
CPC ............ *B23K 9/322* (2013.01); *B23K 9/0956* (2013.01); *B23K 9/126* (2013.01); *B23K 9/1274* (2013.01); *B23K 9/328* (2013.01); *G01C 3/00* (2013.01)

(58) Field of Classification Search
CPC .... B23K 9/0956; B23K 9/126; B23K 9/322; B23K 9/328; G01C 3/00
USPC .............. 219/124.4, 136, 124.34, 130.01; 901/42, 47
See application file for complete search history.

(56) References Cited

U.S. PATENT DOCUMENTS

| | | | |
|---|---|---|---|
| 3,811,027 A * | 5/1974 | Strahan ................. | B23K 9/325 219/132 |
| 4,491,719 A * | 1/1985 | Corby, Jr. ............ | B23K 9/0956 219/124.34 |
| 4,555,613 A | 11/1985 | Shulman | |
| 4,652,133 A | 3/1987 | Antoszewski et al. | |
| 4,698,484 A * | 10/1987 | Babcock ............. | B23K 9/0956 219/124.34 |
| 4,794,223 A | 12/1988 | Barkman et al. | |
| 4,859,829 A | 8/1989 | Dufour | |
| 5,075,534 A | 12/1991 | Torii et al. | |
| 5,264,678 A | 11/1993 | Powell et al. | |
| 5,442,155 A | 8/1995 | Nihei et al. | |
| 5,475,198 A | 12/1995 | Burke et al. | |
| 5,520,062 A | 5/1996 | Watanabe et al. | |
| 5,672,044 A * | 9/1997 | Lemelson ............... | B66C 23/00 414/744.3 |
| 5,811,055 A * | 9/1998 | Geiger ................. | B23K 9/0061 266/48 |

(Continued)

FOREIGN PATENT DOCUMENTS

| DE | 10 2012 210632 A1 | 12/2012 |
| EP | 0 307 236 A1 | 3/1989 |

(Continued)

*Primary Examiner* — Dana Ross
*Assistant Examiner* — Ket D Dang
(74) *Attorney, Agent, or Firm* — Tucker Ellis LLP; Carlos Garritano; Evan Perry

(57) ABSTRACT

The present invention is an enclosure for a laser, the enclosure having positive pressure in the line to generate a positive gas flow within the enclosure so as to keep welding fumes, welding spatter and other contaminants off a laser beam lens.

15 Claims, 3 Drawing Sheets

(56) References Cited

U.S. PATENT DOCUMENTS

| | | | | |
|---|---|---|---|---|
| 5,844,201 A | * | 12/1998 | Dibacco | B23K 9/29 219/136 |
| 5,977,515 A | * | 11/1999 | Uraki | B23K 26/067 219/121.6 |
| 6,407,803 B1 | | 6/2002 | Schrank | |
| 2013/0017128 A1 | * | 1/2013 | Silbert | G01N 35/0099 422/509 |

FOREIGN PATENT DOCUMENTS

| | | |
|---|---|---|
| EP | 0 403 665 A1 | 12/1990 |
| KR | 100815921 B1 * | 3/2008 |

* cited by examiner

LASER ENCLOSURE

CROSS-REFERENCE TO RELATED APPLICATIONS

This invention claims priority to, is a continuation-in-part application thereof, and fully incorporates by reference, U.S. Provisional Patent Application Ser. No. 61/900,436 filed on 6 Nov. 2013.

TECHNICAL FIELD

The present invention pertains to an enclosure for a laser, the enclosure having positive pressure in the line to generate a positive gas flow within the enclosure so as to keep welding fumes, welding spatter and other contaminants off a laser beam lens.

BACKGROUND OF THE INVENTION

Laser distance measuring can be employed in robotic welding operations. Employing a laser permits accurate determination of the location of a weld seam between two surfaces. In operation, a laser light is emitted and impinges upon one surface, then the other surface, to find the exact intersecting weld seam.

In the past, this location was performed by using the wire stick out from the welding torch, to touch sense each surface, in finding the weld seam. For touch sensing with coordinated motion, the touch frame relative to the UFRAME of the robot (follower) was selected of the coordinated frame of the reference group (leader). The reference group was set for the leader group so that the search direction will be relative to that group.

Typically, only one search motion is used for each search direction. Some search patterns require two search motions in each of two search directions for the software to calculate an angular offset. Search patterns determine the type of information stored in the position register. The stored information is either the found position or position offset information depending on the search pattern used.

Up to five search motions in one search direction can be done to improve the accuracy of locating an object. When more than one search motion in a direction is used, the software calculates an average value of the searches and uses the average for the offset calculation except when using the search pattern 1D+Rotate, 2D+Rotate, or 3D+Rotate.

The laser is much more accurate and preferred by many customers. However, in light of the fact that the laser is positioned in close proximity to the welding gun, the lens of the laser often becomes contaminated with welding fumes and spatter, resulting in inaccurate measurements.

What is needed is a laser enclosure which houses the laser generating apparatus, and which is under positive internal pressure and/or positive gaseous flow about the laser lens, so as to protect the lens from contamination by the welding operation.

BRIEF SUMMARY

A robotic welding system is described having at least the following component parts: at least one robotic arm having a welding torch affixed to a distal end thereof; at least one housing affixed to the at least one robotic arm in proximity to the welding torch, the housing containing at least one laser beam generator which generates at least one laser beam, said at least one laser beam egressing from said housing through at least one laser beam lens; the housing further comprising an openable cover plate positioned toward the distal end of the of the robotic arm, said plate moving from an open to a closed position; at least one source of compressed gas; the at least one source of compressed gas flowing about the at least one laser beam generator and the at least one laser beam lens when the cover plate is in the open position and the at least one source of compressed gas not flowing when the cover plate is in the closed position; and the cover plate being in the open position during setup of the robotic welding system and said cover plate being in the closed position during operation of the robotic welding system.

The compressed gas is selected from the group consisting of air, helium, nitrogen, neon and argon, typically air. The cover plate may move from the open to the closed position by manual operator intervention or automatically.

A process for using a robotic welding system is described of at least the following steps: opening a cover lid on a housing containing a laser beam generator and laser beam lens, said step of opening starting a flow of a compressed gas; using said laser beam to determine a welding location; closing the cover lid on the housing, the step of closing stopping a flow of said compressed gas; and performing a welding operation at the welding location using the robotic welding system.

The process of opening and closing may be manually performed or automated. The compressed gas is selected from the group consisting of air, helium, nitrogen, neon and argon, typically air.

In another aspect of the invention, a robotic welding system is described which includes: at least one robotic arm having a welding torch positioned at a distal end thereof; at least one laser beam having a laser beam lens in proximity to the welding torch; at least one protective means for shielding said at least one laser beam lens from contaminants generated during a welding operation, the at least one protective means having at least an open and a closed position; at least one source of a compressed gas entering the at least one protective means; the at least one source of compressed gas flowing about at least said laser beam lens when the at least one protective means is in the open position and the at least one source of compressed gas not flowing when the at least one protective means is in the closed position; and the at least one protective means being in the open position during setup of the robotic welding system and the at least one protective means being in the closed position during operation of the robotic welding system.

In this embodiment, the at least one protective means is a combination of a housing for the at least one laser generator and a pivotable cover plate on the housing.

DETAILED DESCRIPTION OF THE INVENTION

Figure 1:
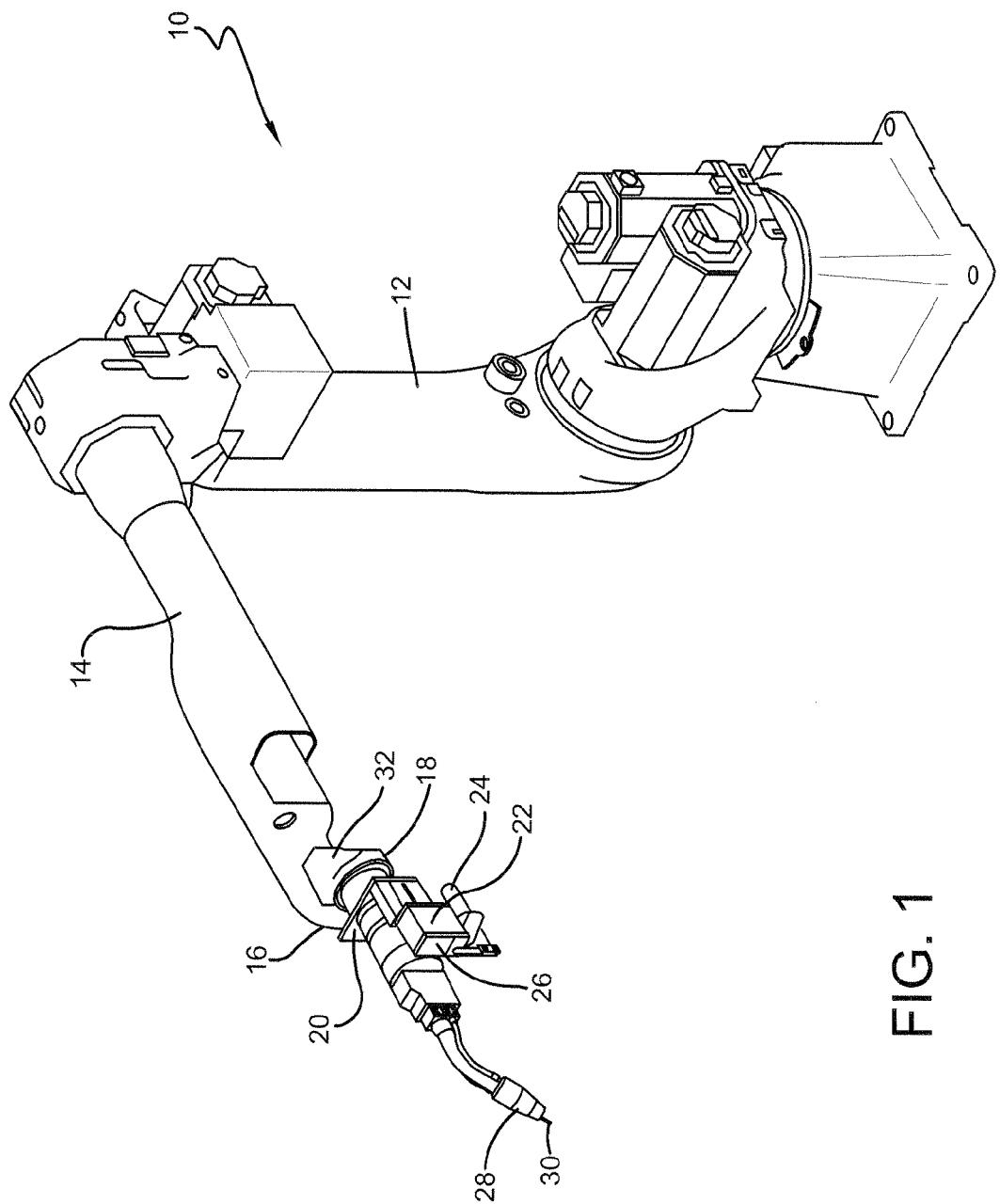
FIG. 1 is front perspective view of a robot arm with mounting bracket and laser enclosure.

Referring now to the drawings wherein the showings are for purposes of illustrating embodiments of the invention only and not for purposes of limiting the same, FIG. 1 shows robotic welding apparatus 10. This welding apparatus will have a least a first 12 and a second 14 arm, with welding nozzle 28 affixed to the distal end of second arm 14. Positioned rearward of distal end of the second arm is laser mounting bracket 20, illustrated in the figure as transversely positioned about a longitudinal axis of second arm 14 through aperture opening in mounting bracket 20. Affixed to inwardly projecting leg of the mounting bracket is bracket leg 32 positioned essentially parallel to the longitudinal axis of second welding arm 14.

Figure 2:
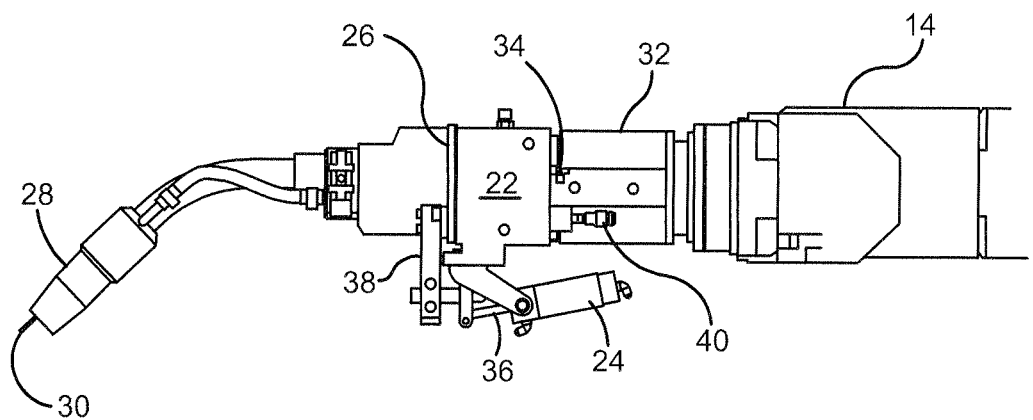
FIG. 2 is a side elevational view of a robot arm where the laser enclosure is mounted.
Figure 3:
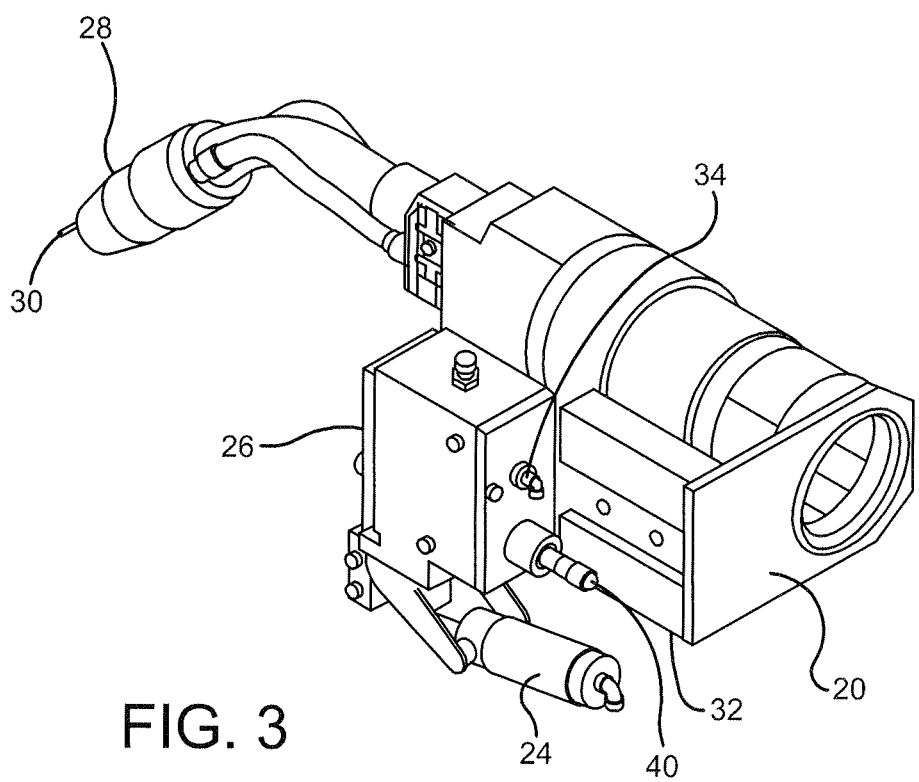
FIG. 3 is a rear perspective view of the front portion of the robot arm with associated bracket and laser enclosure.

As better illustrated in FIGS. 2 & 3, bracket leg 32 is affixed to the rear of essentially rectangular housing 22, the housing having inlet 40 for cables specific to the operation of a laser unit positioned within housing 22 and inlet 34 for gaseous access of a compressible gas. The choice of the compressible gas is determined by the end-use application of the robotic welding operation and may be compressed air (or any other possible compressed gases, e.g., helium, nitrogen, neon, argon, etc.), which has been down regulated from a higher gauge pressure to a lowered inlet pressure. Inlet 34 may be a quick-connect gas connection which optionally may have a check valve positioned upstream thereof. At a bottom of housing 22 is pivotable and hinged cover plate 26, the pivoting action of which is effected by pneumatic cylinder or piston 24 with rod 36 affixed to pivot arm 38, the rod moving into and out of cylinder 24 as determined by whether the welding operation is being performed, or is in the setup phase.

During the welding process cover plate 26 is in the "closed" position. This is typically an automated process which is programmed by the robot/welding technician. During the setup phase, cover plate 26 is in the "open" position. Therefore in the course of a welding program the cover plate for housing 22 will "open" and "close" as programmed, protecting the laser and specifically the laser lens during the welding procedure.

When the cover plate 26 is in the "open" position, inlet valve 34 is in opened and the positive pressure in the inlet gas feed line allows positive air circulation about the laser apparatus, venting into the atmosphere. The positive flow of compressed gas (e.g., air) will "flush" out all fume that could potentially place a "film" on the lens of the laser, where the laser light beam is emitted. The value in keeping the laser lens free of fume build up, resides in the fact that the laser beam, which used to take measurements to define where the robotic weld will occur, becomes inaccurate, as a film accumulates on the laser lens, the film coming from fume and smoke attributable to the welding operation.

Inlet valve 34 allows compressed gas (e.g., air) to flush over the laser apparatus and laser lens inside housing 22, keeping all welding fumes out and away from the laser and laser lens. The welding technician will be able to program when the air flow is activated and synchronize the flow of gas with the opening of cover plate 26 on housing 22, enabling the laser to take measurements unobstructed by fume/smoke. While an automated opening/closing of cover plate 26 is preferred, this invention is equally applicable to manual operation of the cover plate. At least one aspect of the invention resides in the recognition that in light of the close proximity of the laser lens to the actual welding wire 30, protection of the laser lens will enable any robotic laser welding operation to proceed for longer periods of uninterrupted time due at least in part to less contamination of the laser lens.

Figure 4:
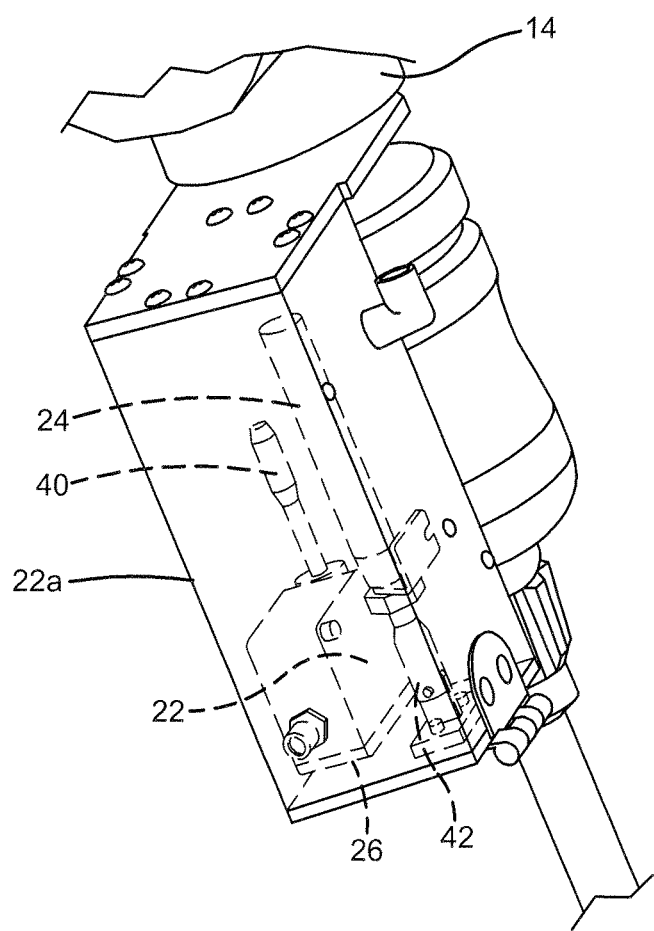
FIG. 4 is a side perspective view of an expanded housing enclosing at least the laser beam generator and associated lens with at least an actuator for the pivotable cover plate, the mechanical components which are internal to the housing illustrated in ghost.

As better illustrated in FIG. 4, essentially rectangular housing 22a may protect more than just the laser unit as shown in FIGS. 2-3. As illustrated, the housing may be enlarged so as to protect at least pneumatic cylinder or piston 24 with associated rod 36 and yoke 42, the combination of which is in operative association with hinged cover plate 26. In addition the housing will still have an inlet for cables specific to the operation of the laser unit positioned within the housing and an inlet for gaseous access of a compressible gas, the choice determined by the end-use application of the robotic welding operation and may be compressed air (or any other possible compressed gases, e.g., helium, nitrogen, neon, argon, etc.), which has been down regulated from a higher gauge pressure to a lowered inlet pressure. As mentioned previously with reference to FIGS. 2-3, inlet 34 may be a quick-connect gas connection which optionally may have a check valve positioned upstream thereof.

The invention has been described herein with reference to the disclosed embodiments. Obviously, modifications and alterations will occur to others upon a reading and understanding of this specification. It is intended to include all such modifications and alterations insofar as they come within the scope of the appended claims or the equivalents thereof.

The invention claimed is:

1. A robotic welding system which comprises:
   at least one robotic arm having a welding torch affixed to a distal end thereof;
   at least one housing affixed to the at least one robotic arm in proximity to the welding torch, the housing containing at least one laser beam generator which generates at least one laser beam, said at least one laser beam egressing from said housing through at least one laser beam lens, said housing and welding torch in fixed, non-movable relationship to each other;
   the housing further comprising an openable cover plate positioned toward the distal end of the of the robotic arm, said plate moving from an open to a closed position;
   at least one source of compressed gas;
   said at least one source of compressed gas flowing about said at least one laser beam generator and said at least one laser beam lens when said cover plate is in the open position and said at least one source of compressed gas not flowing when said cover plate is in the closed position; and
   said cover plate being in the open position during setup of the robotic welding system and said cover plate being in the closed position during operation of the robotic welding system.

2. The robotic welding system of claim 1 wherein said compressed gas is selected from the group consisting of air, helium, nitrogen, neon and argon.

3. The robotic welding system of claim 2 wherein said compressed gas is air.

4. The robotic welding system of claim 1 wherein said cover plate moves from the open to the closed position by manual operator intervention.

5. The robotic welding system of claim 1 wherein said cover plate moves from the open to the closed position automatically.

6. The robotic welding system of claim 5 wherein said openable cover plate moves from said open to said closed position by reciprocating action of a piston.

7. The robotic welding system of claim 6 wherein
said housing encloses at least said laser beam generator and said piston.

8. A robotic welding system which comprises:

at least one robotic arm having a welding torch positioned at a distal end thereof;

at least one laser beam having a laser beam lens in proximity to the welding torch, said laser beam lens and welding torch in fixed, non-movable relationship to each other;

at least one protective means for shielding said at least one laser beam lens from contaminants generated during a welding operation, said at least one protective means having at least an open and a closed position;

at least one source of a compressed gas entering said at least one protective means;

said at least one source of compressed gas flowing about at least said laser beam lens when said at least one protective means is in said open position and said at least one source of compressed gas not flowing when said at least one protective means is in the closed position; and said at least one protective means being in the open position during setup of the robotic welding system and said at least one protective means being in the closed position during operation of the robotic welding system.

9. The robotic welding system of claim 8 wherein
said at least one source of compressed gas is selected from the group consisting of air, helium, nitrogen, neon and argon.

10. The robotic welding system of claim 9 wherein
said at least one source of compressed gas is air.

11. The robotic welding system of claim 8 wherein
said at least one protective means moves from the open to the closed position by manual operator intervention.

12. The robotic welding system of claim 8 wherein
said at least one protective means moves from the open to the closed position automatically.

13. The robotic welding system of claim 8 wherein
said at least one protective means is a combination of a housing for said at least one laser generator and a pivotable cover plate on said housing.

14. The robotic welding system of claim 13 wherein
said pivotable cover plate moves from said open to said closed position by reciprocating action of a piston.

15. The robotic welding system of claim 14 wherein
said housing encloses at least said laser beam generator and said piston.

\* \* \* \* \*